United States Patent

Kress et al.

[11] Patent Number: 5,795,111
[45] Date of Patent: Aug. 18, 1998

[54] REAMER WITH STEPPED KNIFE

[75] Inventors: Dieter Kress, Aalen; Friedrich Häberle, Lauchheim, both of Germany

[73] Assignee: Mapal Fabrik fur Prasisionswerkzeuge, Germany

[21] Appl. No.: 648,228

[22] Filed: May 13, 1996

[30] Foreign Application Priority Data

May 15, 1995 [DE] Germany ............ 195 18 241.3

[51] Int. Cl.$^6$ .................................. B23B 51/00
[52] U.S. Cl. ................ 408/224; 408/83; 408/199; 408/713; 408/231
[58] Field of Search ............ 408/83, 143, 223–225, 408/231–233, 705, 713, 199, 227, 229

[56] References Cited

U.S. PATENT DOCUMENTS

| | | | |
|---|---|---|---|
| 4,547,102 | 10/1985 | Millington et al. | 408/705 |
| 4,605,347 | 8/1986 | Jodock et al. | 408/224 |
| 5,312,208 | 5/1994 | Shiga et al. | 408/227 |
| 5,474,406 | 12/1995 | Kress et al. | 408/199 |
| 5,478,179 | 12/1995 | Kress et al. | 408/83 |

*Primary Examiner*—Steven C. Bishop
*Attorney, Agent, or Firm*—Ostrolenk, Faber, Gerb & Soffen, LLP

[57] ABSTRACT

A reamer for precision machining of holes includes a reamer body and a knife plate supported above the exterior of the body and extending along the exterior. The knife plate has a front lower radial height cutting region and a rear taller radial height cutting region joined by an inclined step so that the first front region does the major cutting and the second rearward region does the finer machining. The front cutting region has an entrance bevel. The inclined flank shapes of the cutting regions are disclosed. Reamer guide strips supported along the support have a similarly shaped bevel and step as the knife plate.

36 Claims, 3 Drawing Sheets

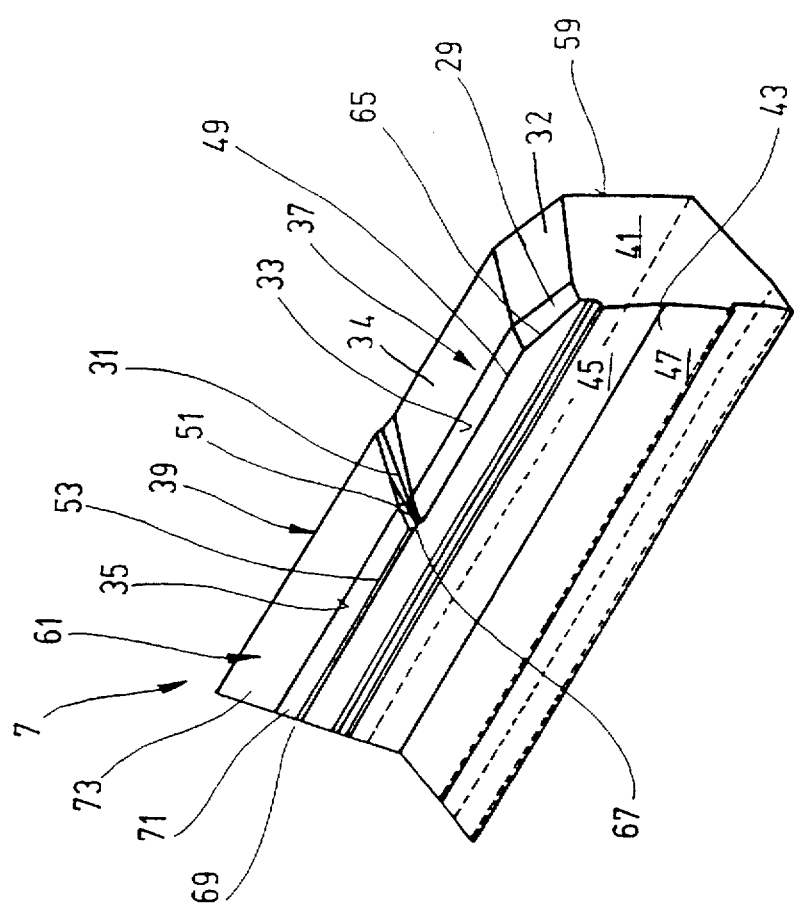
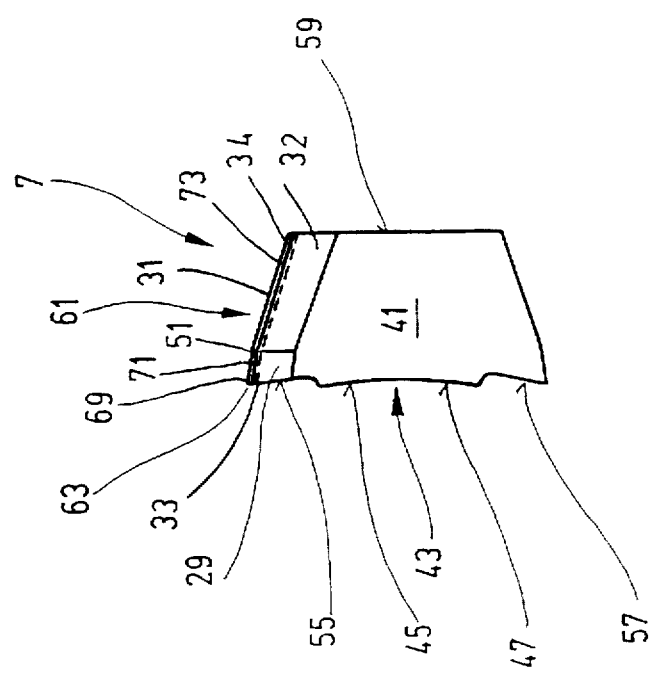

REAMER WITH STEPPED KNIFE

BACKGROUND OF THE INVENTION

The present invention relates to a reamer for precision machining, in particular micro-machining, of surfaces of a bore hole and particularly relates to the design of the knife plate of the reamer to have sections of different capabilities for achieving longer reamer useful life.

Reamers of this type are used to produce boreholes of particular precision, particularly having a surface of high surface quality and accuracy of size. It is particularly important that the precision of the holes being reamed remain constant over reaming of a large number of parts. It has been found, particularly when cutting reamers are used to work steel, that the useful life of the tool has been relatively short. The bore dimension of successively reamed holes therefore undesirably decreases relatively rapidly.

SUMMARY OF THE INVENTION

The object of the present invention is to provide a reamer of the aforementioned type which does not have the above disadvantages.

In order to achieve this purpose, the reamer of the invention includes a knife plate comprised of two cutting regions which are separated from each other by a step. Both cutting regions work or machine the same hole surface. The longitudinally front end or first cutting region to contact the work piece is of shorter radial height than the second longitudinally rearward cutting region. With this design, the load applied on the radially outer cutting region during use of the reamer is a reduced load, producing substantially reduced wear. It has been found that the useful life of the reamer, while maintaining the dimension of the borehole being reamed, remains within precision machining qualities from five to ten times as long as when traditional reamers are used.

In a particularly preferred reamer, the step between the forward and rearward cutting regions is at a radial height of about 0.05 mm. The radially outer, rearward cutting region therefore serves for precision machining or micromachining while the radially inward, forward cutting region serves for the main machining.

In a further preferred embodiment the length of the first or front cutting region, longitudinally to the front in the direction of feeds, is about 3 mm. This assures that the step between the first cutting region and the second following cutting region in the direction of feed is very small, and the second cutting region is associated with the precision working.

Furthermore, in the preferred embodiment of the reamer, the first cutting region of the knife plate has a front or first end with a bevel shape which tapers down or radially inward in the direction of feed, i.e., toward the front of the reamer. This makes it possible to guide the tool precisely into the hole being reamed and permits optimal support on the guide surfaces of the guide device.

In the preferred embodiment of the reamer, the step between the first and second cutting regions has a surface that is inclined radially inward in the direction of feed, i.e., toward the front edge and serves as a primary cutting edge of the second cutting region. This provides optimal guidance of the tool in the hole, again in the transition region between the two cutting regions.

Finally, in a preferred embodiment of the reamer, the guide device has two guide strips with respective front end regions which are provided with respective bevels which are adapted to the bevel in the knife plate. Optimal guidance of the tool upon its introduction into the hole to be machined is thereby established. This assures that the initial region of the hole machined also has a surface of particularly high quality and dimensional precision.

Other objects and features of the invention are explained below with reference to the drawings.

BRIEF DESCRIPTION OF THE DRAWINGS

FIG. 3 is a view of the end of the knife plate; and

FIG. 4 is a perspective view of the front part of a knife plate.

DESCRIPTION OF A PREFERRED EMBODIMENT

Figure 1:
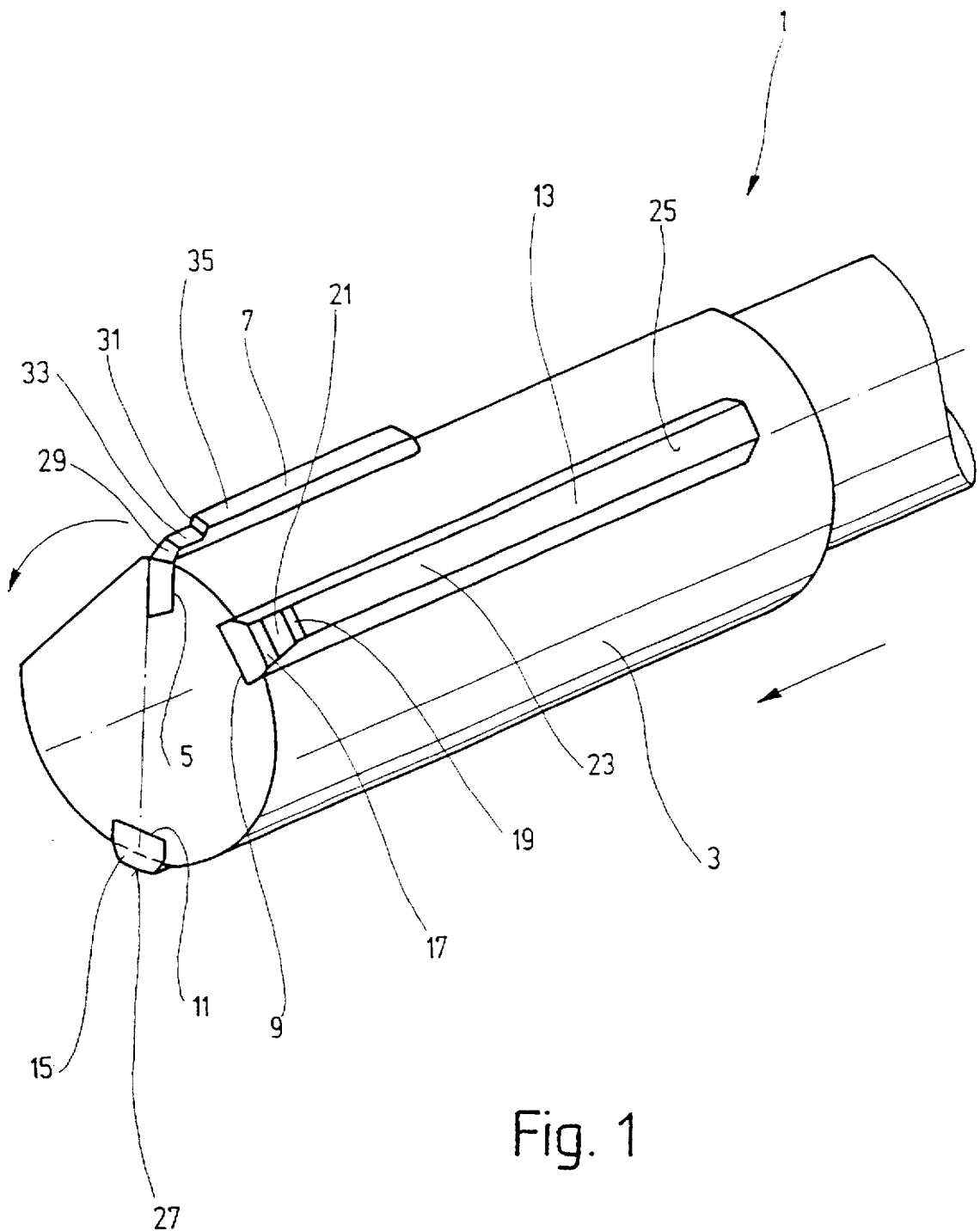
FIG. 1 is a perspective view of a reamer according to the invention.

FIG. 1 somewhat schematically shows, in principle, how the reamer 1 of the invention is developed. A knife plate 7 is inserted into a groove 5 provided in the circumferential wall 3 of the reamer. The plate 7 is secured there in suitable, known manner, for instance by one or more clamping claws, not shown. The circumferential wall has two further grooves 9 and 11 shaped for receiving and in which are inserted respective guide strips 13 and 15, which extend in the longitudinal direction of the reamer 1. The first guide strip 13 is arranged about 40° behind the knife plate 7, as seen in the direction of rotation indicated by an arrow. The second guide strip 15 is arranged diametrically opposite the knife plate 7. The lengths of both guide strips 13 and 15 are substantially longer than the length of the knife plate 7 along the wall 3.

The guide strips 13 and 15 are provided on their front sides, as seen in the direction of feed indicated by an arrow, each with a respective bevel 17 which is formed by a surface which descends forwardly in the direction of feed. Adjoining each bevel 17 there is a step 19, so that a radially inner forward region 21 and a radially outer rearward region 23 are formed. The guide strips have respective outer guide surfaces 25 and 27, which support the reamer in the borehole to be machined.

The knife plate 7 has a front end bevel 29 which is inclined inwardly and forwardly. It also has a step 31, which defines the radially inner, front cutting region 33 and a radially outer rear cutting region 35, as viewed in the feed direction.

The bevels of the knife plate and of the guide strips and their arrangement and placement in the longitudinal direction of the steps in the knife plate and in the guide strips are adapted to each other so that upon introduction of the reamer 1 into a hole to be machined, optimal guidance of the reamer is provided and the entrance region of the hole already has a surface of particular precision.

Figure 2:
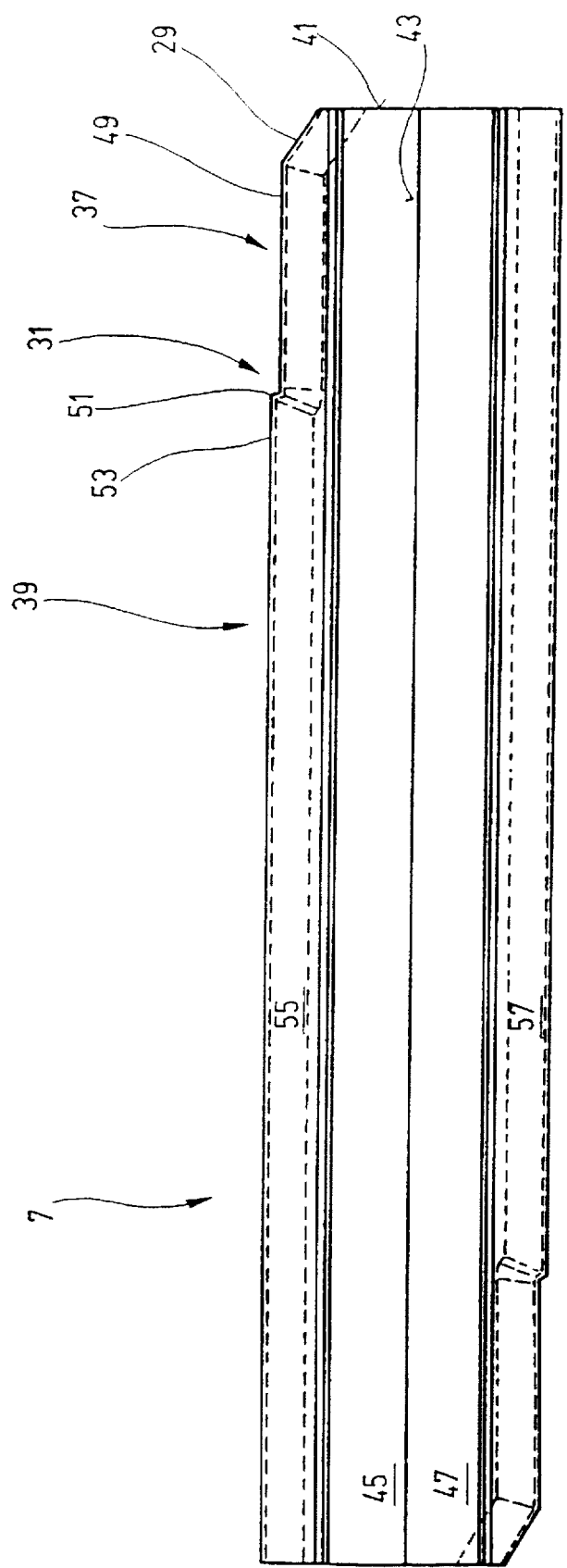
FIG. 2 is a front view of a knife plate for use in the reamer.

FIGS. 2 and 3 show that the knife plate 7 is a so-called reversible plate, which can be installed in the wall 3 with one or the other set of cutting regions exposed so as to be able to selectively position the knife plate to cut with either set of cutting regions. The knife plate is developed identically on its two diagonally opposite edge regions. The right upper region of the knife plate 7 is developed in the same manner as its left lower region, except that the cutting edges both face in the same direction, to the left in FIG. 3. The following description refers only to the right upper region, but applies similarly to the lower left. In this description, the front and rear directions are lengthwise along the reamer, while an edge or surface is leading when it precedes another edge or surface that is trailing in the rotation direction of the reamer.

The knife plate 7 has a front first cutting region 37 in the direction of feed, which is followed to the rear by the step 31 which is in turn followed to the rear by a second cutting region 39. Both cutting regions 37 and 39 machine the same surface of a bore hole. The first cutting region 37 provides the main machining while the second cutting region 39, which follows rearward in the direction of feed, provides precision machining, particularly micro-machining. The height of the step 31 between the cutting regions 37, 39 can be selected from within a range of 0.01 mm to 0.1 mm. However, the height is preferably within the range of 0.02 mm to 0.06 mm. A height of about 0.043 mm to 0.05 mm has proven particularly suitable. The rear cutting region 39 is correspondingly taller than the front cutting region 37.

The knife plate 7 is clamped fast in the reamer 1 in such a manner and therefore with its leading cutting edge above the surface of the wall 3, that upon the machining of the surface of a bore hole by the first cutting region 37, a chip of a thickness of about 0.2 mm is removed from the surface or hole, while the depth of the further cut made by the second cutting region 39 is at most about 0.05 mm. This adjustment assures that, upon wear of the cutting edges, the depth of the cut made by the second cutting region 39 is increased by about 0.01 mm.

The length of the first cutting region 37, measured in the longitudinal direction of the knife plate 7 between the front end 41 of the knife plate and the step 31, is preferably from 5 mm down to 1 mm. A length of about 3.0 mm has proven particularly suitable. Depending on the use of the reamer 1, a length in the range of 10 mm down to 0.5 mm is also possible. The second region 39 occupies the remainder of or at least a substantial part of the length of the reamer.

FIG. 2 shows that the total length of the knife plate 7 is substantially greater than the length of its first cutting region 37. This assures that the knife plate 7 can be clamped fast in the reamer 1 so that attempted tilting movement of the knife plate 7 with respect to the base body of the reamer 1 will not move the plate out of its adjustment position, even under the forces occurring upon the machining of a surface of a hole.

The embodiment of the knife plate shown, as seen in front view in FIG. 2, is substantially rectangular. It can be made relatively small and can be used also for reamers 1 having a small outside diameter.

To assure dependable clamping of the knife plate 7 in the base body of the reamer, a clamping groove is provided on the front side 43 of the knife plate 7, which is also referred to as the knife breast. That groove has two clamping surfaces 45 and 47 which generally extend at an obtuse angle to each other and cooperate with the clamping lip of a clamping claw, not shown, which fastens the knife plate 7 in the groove 5 of the reamer 1.

Near its front end 41, the knife plate 7 has a bevel surface 29, which descends at an angle forwardly in the direction of feed of the reamer. The bevel 29 forms the primary leading cutting edge 65 of the first cutting region 37. The cutting edge 65 can extend from the front end 41 rearward to the secondary cutting edge 49 on the leading edge of the non-inclined, first cutting region 37. The cutting edge 49 adjoins the primary cutting edge 65 at a constant angle of, for instance, 30°. However, it is also possible for the primary cutting edge 65 to have a region directly adjoining the secondary cutting edge 49 which has a flatter angle of descent.

The secondary cutting edge 49 differs from the primary cutting edge 29 in that the edge 49 very gradually descends in the rearward direction opposite the direction of feed, preferably by an angle of, for instance, 1°.

The step 31 also has a surface 51 which is inclined in the direction of feed, as seen in FIG. 2, the flank angle of incline lying within a range of $\leq 90°$ to 20°, and in particular a range of 70° to 50°, preferably to about 60°. The primary cutting edge 67 of the second cutting region 39 is located in the region of the step surface 51. Adjoining the primary cutting edge 67 is the secondary cutting edge 53 of the second cutting region 39, which like the edge 49 is also inclined inwardly in the direction opposite the direction of feed.

The front view of FIG. 2 shows cutting faces 55 and 57 that extend parallel to the longitudinal edges of the knife plate 7 and parallel to the clamping surfaces 45 and 47.

From the front end 41 of the knife plate 7, in FIG. 3, the following can be noted:

The trailing or rear side 59 of the knife plate 7 extends parallel to the leading or front side 43. Starting from the leading side 43, a flank 61 of the plate extends towards the trailing side 59. The flank 61 forms an acute angle with the leading side 43. The flank 61 has various surface sections which descend radially inwardly at different angles to the trailing side 59. A first section 69, which directly adjoins the cutting edge 63 of the second cutting region 37, descends, for instance, at an angle of 1°. A second section 71 of the flank 61 adjoins the first section 69 and that descends at an angle of about 7°. Finally, a third section 73 of the flank which extends substantially over the entire thickness of the knife plate 7 descends at an angle of, for instance, 18°. The first section 69 of the flank 61 is very narrow and directly adjoins the cutting edge 63. The second section 71 is substantially narrower than the third section 73. The front cutting region also has a flank defined by the leading bevel 29 and trailed by the radially descending bevel part and by the front region 33 which adjoins the bevel 29 and the front region is trailed by the descending flank 34.

FIG. 3 shows that the cutting faces 55 and 57 form an acute angle with a theoretical vertical plane which coincides with the front side 43 of the knife plate 7 or extends through the cutting edge 63.

Finally, the different cutting edges of the knife plate lie in the section line of the cutting face 55 and the flank 51.

For easier understanding, the front side 43 of the knife plate 7 is again shown in perspective. The same parts are provided with the same reference numerals, so that reference is had to the description of the preceding Figures.

The Figure particularly clearly shows the two cutting regions 37 and 39 which are separated by the step 31. Upon the introduction of the reamer into a hole to be machined, the knife plate 7 first contacts the wall of the borehole with the bevel 29. In corresponding manner, the bevels of the guide strips also contact the wall of the hole so that the reamer is optimally introduced into the borehole. The primary cutting edge 65 of the first cutting region 37 lies in the region of the bevel.29. At a bend, the primary cutting edge 65 passes into the secondary cutting edge 49 of the first cutting region 37.

In a corresponding manner, the surface 51 of the step 31, which surface descends in the direction of feed, forms the primary cutting edge 67 of the second cutting region 39. This primary cutting edge passes via a step into the secondary cutting edge 53 of the second cutting region 39.

FIG. 4 shows particularly clearly that the knife plate 7 has two cutting regions 37 and 39 which pass into each other via the step 31 and which, in particular, serve for machining of the same region of surface of the hole. The flanks of the two cutting regions 37 and 39 here have different clearance angles. In this connection, in the first cutting region 37, chips of a thickness of about 0.2 mm are removed so that the region 37 performs the main machining. Since the height of the step 31 is selected to be very slight, the second cutting region 39 provides precision machining or micro-machining. In the second region, chips of a thickness of about 0.05 mm are removed. Because the main load lies in the first cutting region 37, it clearly relieves the second cutting region 39 from load. Upon wearing of the first cutting region 37, the desired precision of the surface is nevertheless maintained since only in the second cutting region 39 is a somewhat thicker chip removed, in which connection the thickness of the chip can increase by about 0.01 mm. This still assures that the desired precision of the surface of the hole is maintained.

By splitting up of the load regions of the knife plate 7, the reamer has a very long useful life, perhaps five to ten times longer than life of traditional knife plates 7.

In order to assure the described advantages of the knife plate 7, the length of the step between the two cutting regions and therefore the length of the first cutting region 37 should be as short as possible. A length for the cutting region 37 of at most 3 mm has proven particularly favorable.

FIG. 3 shows that with a turning and a feeding movement of the reamer as seen from FIG. 1, chips that are removed from the surface of the hole can run down on the cutting face 55 and can be moved away from the place of machining. The flank 61 assures that the reamer does not freeze in the hole. The sections of the flank 61 which descend at different angles make it possible to provide for a narrow region immediately adjoining the cutting edge. This assures the support of the knife plate 7 and of the reamer 1 in the hole. This narrow strip 69 in FIG. 4 of the flank 61 supports the knife plate. Adjoining this first, very flatly descending section 69 of the flank there is still another relatively narrow section 71 which then passes into the third section 73.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A reamer for precision machining of surfaces of bore holes, the reamer comprising:

a rotatable support having a longitudinal direction and an exterior;

a knife plate on the support, extending along the longitudinal direction of the support and projecting radially above the exterior; the knife plate and the support having a front end with reference to the feed direction;

the knife plate having first and second longitudinally separate cutting regions:

the first cutting region being toward the front end of the reamer and being of shorter radial height above the exterior;

the second cutting region being rearward of the first cutting region and being of taller radial height;

a step in the knife plate between the different height first and second cutting regions, whereby both of the first and second cutting regions can machine a surface of a hole.

2. The reamer of claim 1, further comprising at least one guide supported on the support around the support away from the knife plate for cooperating with the knife plate for guiding the reamer into a hole.

3. The reamer of claim 1, wherein the step has a radial height in the range of 0.01 mm to 0.1 mm.

4. The reamer of claim 1, wherein the step has a radial height in the range of 0.02 mm to 0.06 mm.

5. The reamer of claim 1, wherein the step has a radial height of about 0.04 mm.

6. The reamer of claim 1, wherein the first cutting region is shaped for performing the main cutting by the reamer and the second cutting region is shaped for precision machining of the hole that has been cut by the first cutting region.

7. The reamer of claim 6, wherein the knife plate and the cutting regions thereof are so positioned in height above the exterior of the support that the first cutting region removes chips with a thickness of about 0.2 mm and the second cutting region removes chips with a thickness in the range of 0.02 mm to 0.08 mm.

8. The reamer of claim 6, wherein the knife plate and the cutting regions thereof are so positioned in height above the exterior of the support that the first cutting region removes chips with a thickness of about 0.2 mm and the second cutting region removes chips with a thickness in the range of 0.03 mm to 0.06 mm.

9. The reamer of claim 6, wherein the knife plate and the cutting regions thereof are so positioned in height above the exterior of the support that the first cutting region removes chips with a thickness of about 0.2 mm and the second cutting region removes chips with a thickness of about 0.05 mm.

10. The reamer of claim 1, wherein the length of the first cutting region in the longitudinal direction of the reamer is in the range of 10 mm to 0.5 mm.

11. The reamer of claim 10, wherein the step has a radial height in the range of 0.01 mm to 0.1 mm.

12. The reamer of claim 1, wherein the length of the first cutting region in the longitudinal direction of the reamer is in the range of 5 mm to 1 mm.

13. The reamer of claim 1, wherein the length of the first cutting region in the longitudinal direction of the reamer is about 3 mm.

14. The reamer of claim 1, wherein the total length of the knife plate in the length direction is substantially longer than the length of the first cutting region thereof in the length direction.

15. The reamer of claim 1, wherein the knife plate is substantially rectangular in shape as viewed from the side.

16. The knife plate of claim 15, wherein the knife plate has opposite longitudinal direction edges, and the knife plate is positionable in the support so that one or the other of the edges is above the exterior of the support;

the knife plate having respective sets of first and second cutting regions on each of the opposite edges.

17. The reamer of claim 15, wherein the knife plate has opposite leading and trailing sides, a clamping groove on the leading side of the knife plate at which the knife plate is clampable in the support, and two clamping surfaces at an obtuse angle to each other on the leading side for defining the clamping groove.

18. The reamer of claim 1, wherein the first cutting region includes a front end, and further comprising a bevel on the front end of the first cutting region of the knife plate, with the bevel descending radially in the forward feed direction.

19. The reamer of claim 18, wherein the bevel has at least one angle of descent.

20. The reamer of claim 18, wherein the bevel has a leading edge to one lateral side thereof that forms the primary cutting edge of the first cutting region;

a secondary cutting edge of the first cutting region located on the one lateral side of the first cutting region and rearward of the primary cutting edge.

21. The reamer of claim 20, wherein the secondary cutting edge descends radially rearwardly in the direction opposite the feed direction.

22. The reamer of claim 20, wherein the step between the first and the second cutting regions includes a surface which is inclined to descend in the direction of feed.

23. The reamer of claim 22, wherein the angle of descent is in the range of 20° to 90°.

24. The reamer of claim 22, wherein the angle of descent is in the range of 50° to 70°.

25. The reamer of claim 22, wherein the angle of descent is in the range which has angle of about 60°.

26. The reamer of claim 20, wherein the second cutting region has a respective second primary cutting edge on the same one lateral side of the second cutting region and the step defines the second primary cutting edge of the second cutting region.

27. The reamer of claim 26, wherein the second cutting region has a respective second secondary cutting edge on the same one lateral side of the second cutting region and the second secondary cutting edge adjoins the second primary cutting edge.

28. The reamer of claim 26, wherein the secondary cutting edge of the second cutting region descends radially rearwardly in the direction opposite the direction of feed of the reamer.

29. The reamer of claim 26, wherein the knife plate has a flank that forms an acute angle with the leading side of the knife plate; and all of the cutting edges of the first and second cutting regions coincide with a section line of a cutting face and the flank forming an acute angle with the leading side of the knife plate.

30. The reamer of claim 29, wherein the flank of the knife plate descends at different angles toward the trailing side of the knife plate opposite the leading side thereof.

31. The reamer of claim 30, wherein the flank of the knife plate at the second cutting region descends radially in a first narrow section strip starting at the leading side at an angle of about 1°, then in a second slightly wider section adjoining the first section at an angle of about 7° and then in a third wider section at an angle of about 18° and intersecting the trailing side of the knife plate.

32. The reamer of claim 29, wherein the flank of the knife plate at both of the first and the second cutting regions descends at angles from the leading side to the trailing side of the knife plate, and the angle of descent of the flank at the first cutting region is different from the angle of descent of the flank at the second cutting region.

33. The reamer of claim 2, wherein the guide device comprises two guide strips supported above the exterior of the support and extending in the length direction of the reamer.

34. The reamer of claim 32, further comprising a bevel on the front end of the first cutting region of the knife plate, with the bevel descending radially in the forward feed direction; and the guide strips having front regions; and the front regions of each of the guide strips, with reference to the feed direction of the reamer, having respective bevels adapted in size to the bevel of the knife plate.

35. The reamer of claim 34, wherein each guide strip has a respective step toward the front region thereof.

36. The reamer of claim 35, wherein the length and height of the steps in the guide strips are adapted to the length and height of the step in the knife plate.

* * * * *

UNITED STATES PATENT AND TRADEMARK OFFICE
CERTIFICATE OF CORRECTION

PATENT NO. : 5,795,111
DATED : Aug. 18, 1998
INVENTOR(S) : Dieter Kress et al.

It is certified that error appears in the above-identified patent and that said Letters Patent is hereby corrected as shown below:

On the title page:

change the name of the assignee to read --Mapal Fabrik für Präsisonswerkzeuge, Germany-- please add to the list of references the following:

--FOREIGN PATENT DOCUMENTS

| | | |
|---|---|---|
| 3,404,005 | 08/14/85 | GERMANY |
| 4,320,511 | 12/22/94 | GERMANY |
| 3,201,137 | 05/05/83 | GERMANY |
| 2,677,256 | 03/22/77 | GERMANY |
| 3,404,005 | 02/05/87 | GERMANY |
| 4,102,716 | 08/08/91 | GERMANY |
| 230,808 | 12/11/85 | GERMANY-- |

Signed and Sealed this

Sixteenth Day of November, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO : 5,795,111
DATED : August 18, 1998
INVENTOR(S) : Dieter Kress and Friedrich Häberle It is certified that error appears in the above identified patent and that said Letters Patent is hereby corrected as shown below.

On the title page:

Please correct the name of the Assignee as follows:

On the cover sheet of the patent, [73] Assignee, change "Prasisionswerkzeuge" to --Präzisionswerkzeuge Dr. Kress KG--.

The name of the Assignee should therefore read:

Mapal Fabrik für Präzisionswerkzeuge Dr. Kress KG

Signed and Sealed this

Eighth Day of August, 2000

Attest:

Q. TODD DICKINSON

*Attesting Officer*      *Director of Patents and Trademarks*